United States Patent [19]
Batra

[11] Patent Number: 5,673,386
[45] Date of Patent: Sep. 30, 1997

[54] METHOD AND SYSTEM FOR IDENTIFICATION OF SOFTWARE APPLICATION FAULTS

[75] Inventor: Jatinder Pal Singh Batra, Westminster, Colo.

[73] Assignee: U S West Technologies, Inc., Boulder, Colo.

[21] Appl. No.: 585,148

[22] Filed: Jan. 11, 1996

Related U.S. Application Data

[63] Continuation of Ser. No. 268,132, Jun. 29, 1994, abandoned.
[51] Int. Cl.$^6$ .................................................. C06F 11/00
[52] U.S. Cl. .............................. 395/183.14; 395/185.1; 395/181
[58] Field of Search .................. 395/183.14, 184.01, 395/185.01, 185.1, 183.01, 182.22, 181

[56] References Cited

U.S. PATENT DOCUMENTS

| | | | |
|---|---|---|---|
| 4,213,015 | 7/1980 | Kimbrough | 179/175.2 |
| 4,390,750 | 6/1983 | Bartelink | 179/5 R |
| 4,517,409 | 5/1985 | Nagasaki | 179/81 C |
| 4,593,274 | 6/1986 | Rizzo | 340/539 |
| 4,644,109 | 2/1987 | Takeda et al. | 379/27 |
| 4,656,319 | 4/1987 | Bially | 379/29 |
| 4,787,062 | 11/1988 | Nei et al. | 364/900 |
| 4,817,137 | 3/1989 | Rosenfeld et al. | 379/377 |
| 4,839,917 | 6/1989 | Oliver | 379/45 |
| 4,881,230 | 11/1989 | Clark et al. | 371/8.2 |
| 4,972,507 | 11/1990 | Lusignan | 455/51 |
| 4,991,105 | 2/1991 | Pimental | 364/483 |
| 4,996,703 | 2/1991 | Gray | 379/40 |
| 5,123,017 | 6/1992 | Simpkins et al. | 371/15.1 |
| 5,157,667 | 10/1992 | Carusone, Jr. et al. | 371/16.5 |
| 5,200,987 | 4/1993 | Gray | 379/40 |
| 5,225,997 | 7/1993 | Lederer et al. | 364/550 |
| 5,237,677 | 8/1993 | Hirosawa et al. | 371/16.5 |
| 5,317,568 | 5/1994 | Bixby et al. | 370/85.6 |
| 5,339,261 | 8/1994 | Adelson et al. | 371/16.5 |
| 5,371,746 | 12/1994 | Yamashita et al. | 371/19 |
| 5,371,883 | 12/1994 | Gross et al. | 371/19 |
| 5,390,326 | 2/1995 | Shah | 371/8.2 |

OTHER PUBLICATIONS

Hobbs, "Loop Testing in a Fibre to the Kerb Environment", IEE Colloq., 1993 IEEE Pub. pp. 12/1–/5.
Bondavalli et al., "Failure Classification with Respect to Detection" Future Trends of Dist. Computing Sys., 1990, IEEE Pub. pp. 47–53.
Griffn, "A fault Diagnosis Prototype For Ethernet LANs", IEE Colloq. (1989) No. 64: Expert Systems for Fault Diagnosis in Engineering.

*Primary Examiner*—Robert W. Beausoliel, Jr.
*Assistant Examiner*—Joseph E. Palys
*Attorney, Agent, or Firm*—Brooks & Kushman

[57] ABSTRACT

A software application fault identification method and system. The method and system include software and accompanying computer hardware platforms for detecting a software application fault, determining a severity of the fault, and identifying a source of the fault. The method and system further include software and accompanying computer hardware platforms for generating an alarm message signal based upon the detected fault, the severity determined and the identified source, as well as transmitting the alarm message signal to a remote monitoring station.

16 Claims, 3 Drawing Sheets

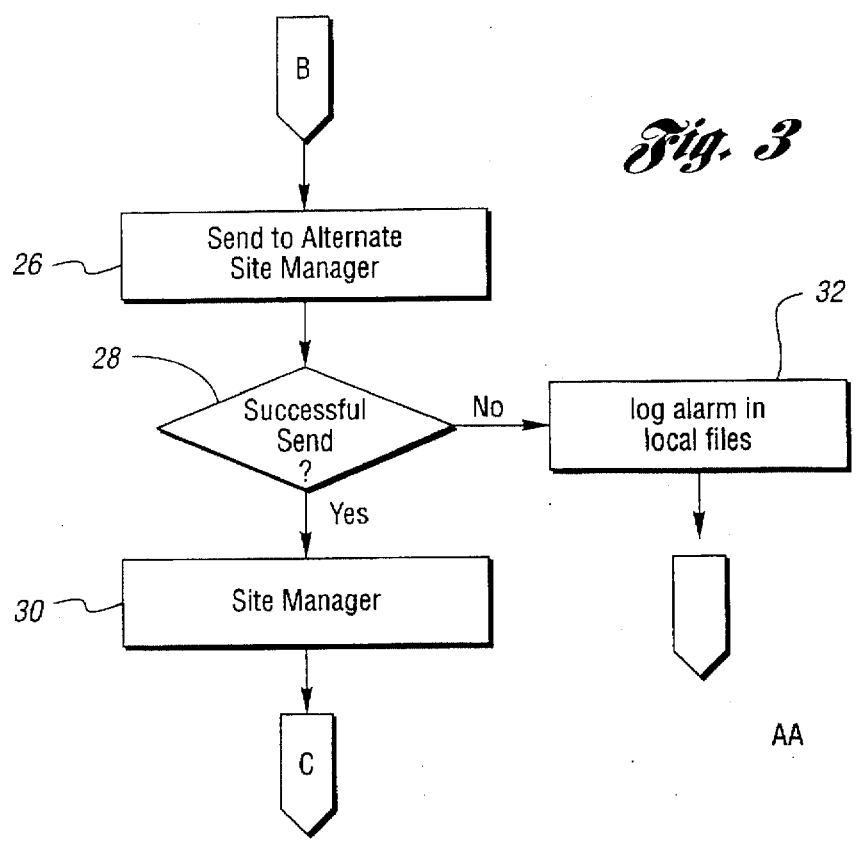
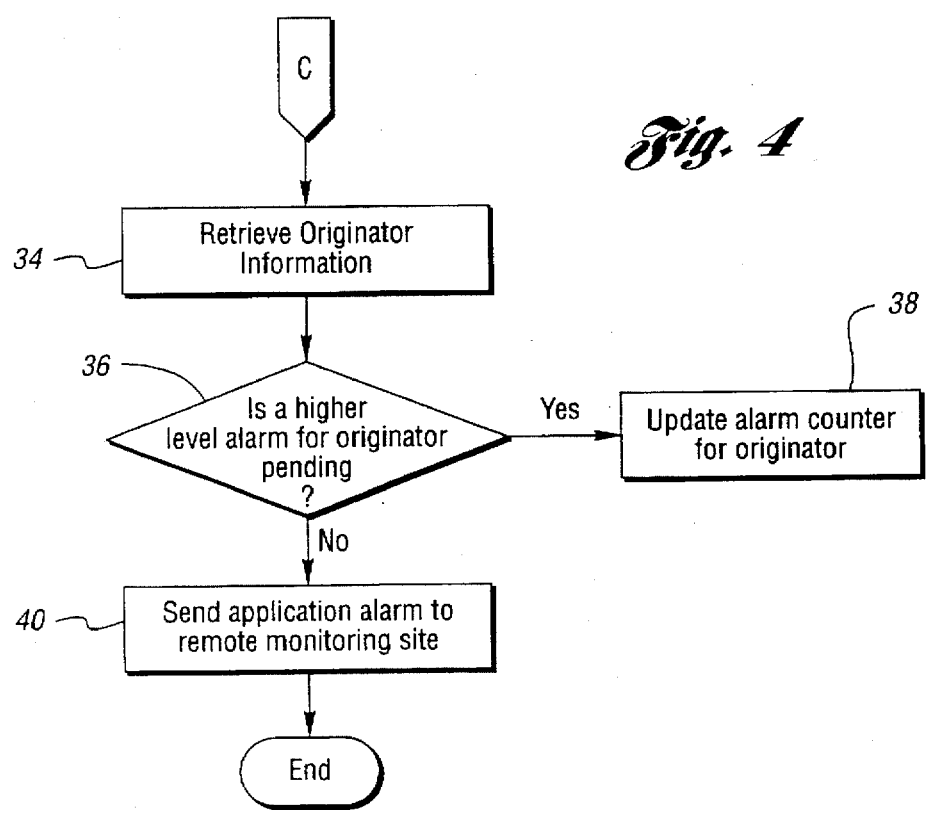

METHOD AND SYSTEM FOR IDENTIFICATION OF SOFTWARE APPLICATION FAULTS

This is a continuation of application(s) Ser. No. 08/268,132 filed on Jun. 29, 1994, now abandoned.

TECHNICAL FIELD

This invention relates to a method and system for advance identification of a fault in a software application.

BACKGROUND ART

An ever increasing number of governmental, commercial and industrial applications are now performed by a variety of computer systems, which typically include applications software and accompanying hardware platforms, such as network devices. As such computer systems have become more widespread and important, a need has arisen for systems and methods for monitoring such computer systems for failure.

There are a number of commercial systems and methods for monitoring network devices and transmitting an alarm message in the event of a device failure. Other systems and methods have been developed for monitoring software applications and transmitting an alarm message in the event of a complete application failure.

However, these software application monitoring systems and methods are incapable of providing any kind of advance notification of a software application failure. Moreover, such systems and methods are incapable of identifying a source associated with the software application failure. As a result, a great deal of time and effort must be spent determining the source and cause of the failure before that failure can be corrected.

Finally, with existing software application monitoring systems and methods, the entire application must be taken out of service while the failure is being corrected. Such down-time ultimately results in lost revenue, increased costs and customer dissatisfaction.

Thus, there exists a need for a system and method for advance identification of a fault in a software application. Such a system and method would preferably identify the source of the application fault and report an alarm associated with that fault, well in advance of a complete application failure. Such a system and method would also preferably provide for alternate routes for reporting the alarm associated with the fault in case the primary route is not available. Additionally, such a system and method would preferably allow for de-commissioning and repair of only that portion of the software application wherein the fault was detected.

In such a fashion, a software application fault could be handled pro-actively. By allowing for only partial de-commissioning, complete application down-time would be reduced or eliminated. Moreover, advance notification of an impending fault and early correction thereof prevents the application from experiencing complete failure. In turn costs associated with the software application would decrease, while revenues and customer satisfaction would increase.

DISCLOSURE OF INVENTION

According to the present invention, then, a method and system for advance identification of a fault in a software application are provided. The method of the present invention comprises detecting the fault, determining a severity of the fault, and identifying a source of the fault. The method further comprises generating an alarm message signal based upon the detected fault, the severity determined and the identified source, as well as transmitting the alarm message signal to a remote monitoring station.

The system for advance identification of a fault in a software application comprises means for detecting the fault, means for determining a severity of the fault, and means for identifying a source of the fault. The system of the present invention further comprises means for generating an alarm message signal based upon the detected fault, the severity determined and the identified source, as well as means for transmitting the alarm message signal to a remote monitoring station.

Accordingly, it is the principle object of the present invention to provide an improved method and system for advance identification of a fault in a software application.

This and other objects, features and advantages will be readily apparent upon consideration of the following detailed description in conjunction with the accompanying drawings.

BRIEF DESCRIPTION OF DRAWINGS

FIG. 3 is a secondary alarm message signal transmission flowchart of the method and system of the present invention for advance identification of a fault in a software application.

FIG. 4 is an alarm message signal filtration flowchart of the method and system of the present invention for advance identification of a fault in a software application.

BEST MODE FOR CARRYING OUT THE INVENTION

Figure 1:
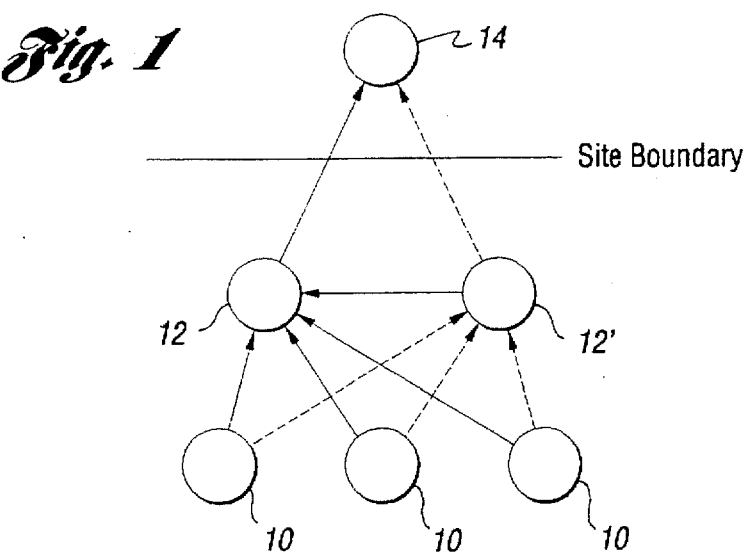
FIG. 1 is a simplified block diagram of the system of the present invention for advance identification of a fault in a software application.

Referring first to FIG. 1, a simplified block diagram of the system of the present invention for advance identification of a fault in a software application is shown. As seen therein, a plurality of client machines (10) are each provided in communication with a primary site manager (12) and a secondary site manager (12'). Client machines (10) may be described as slaves to site managers (12, 12'), or simply as machines that cannot communicate directly with a remote monitoring station (14), which will be described in greater detail below. Client machines (10) are also typically provided in communication with traditional work stations (not shown).

As will also be described in greater detail below, each client machine (10) preferably routes information in the form of signals to primary site manager (12), as long as primary site manager (12) is operational. In the event primary site manager (12) is not operational, each client machine (10) then routes information to secondary site manager (12'). Secondary site manager (12') is itself provided in communication with primary site manager (12) to also route information thereto, as long as primary site manager (12) is operational. In the event primary site manager (12) is not operational, secondary site manager (12') then acts as a primary site manager.

Each site manager (12, 12') is itself provided in communication with a remote monitoring station (RMS) (14). As will again be described in greater detail below, primary site manager (12) preferably routes information in the form of signals to RMS (14), as long as primary site manager (12) is operational. In the event primary site manager (12) is not operational, secondary site manager (12') then acts as a primary site manager routing information to RMS (14).

As seen in FIG. 1, and as its name implies, RMS (14) is preferably located off-site. In addition, while only one RMS (14) is depicted in FIG. 1, any number of RMS (14) may be employed. However, a centralized location for a single RMS (14) is more efficient and cost effective. Similarly, any number of client machines (10) may be employed, even though three client machines (10) are depicted in FIG. 1.

As will be described in greater detail below, however, only up to two site managers (12, 12') are preferably employed. In that regard, one is designated as the primary site manager (12), while the remaining one is designated as the secondary site manager (12'). As previously stated, such secondary site manager (12') is then provided in communication with primary site manager (12), as well as with RMS (14) should the secondary site manager (12') ever be forced to act as a primary site manager.

In addition to the hardware platforms described above, the system of the present invention also comprises computer software, which itself performs, either alone or in combination with the software application being monitored, the method of the present invention for advance identification of a fault in a software application. The operation of such software is shown in the series of flowcharts depicted in FIGS. 2-4.

In general, by injecting the system software directly into software applications and processes, the logic of those software applications and processes may be monitored on different hardware platforms. These processes are instrumented using a library provided with the system of the present invention. As a software application executes, it uses if-then type statements to determine whether it is executing properly. If a problem is detected, the software application raises an alarm, the severity of which is based on the severity of the problem. This alarm goes unnoticed by any operator interacting with the software application. Thereafter, the software application triggers the system software. The system software receives the alarm and, based on the severity level, transmits it to an appropriate location, which may be RMS (14).

Using a filtration and escalation technique, the alarm is routed to a remote monitoring station, the physical location of which need not be known, where the problem may be corrected. In that regard, the particular process within the application having the detected fault may be taken off-line, repaired, and re-commissioned. In the event of a breakdown of the primary path to the remote monitoring station, a secondary path is utilized. However, the primary path is always monitored and employed whenever it is available. Like the alarm itself, switching between primary and secondary paths goes unnoticed by any operators interacting with the software application.

Figure 2:
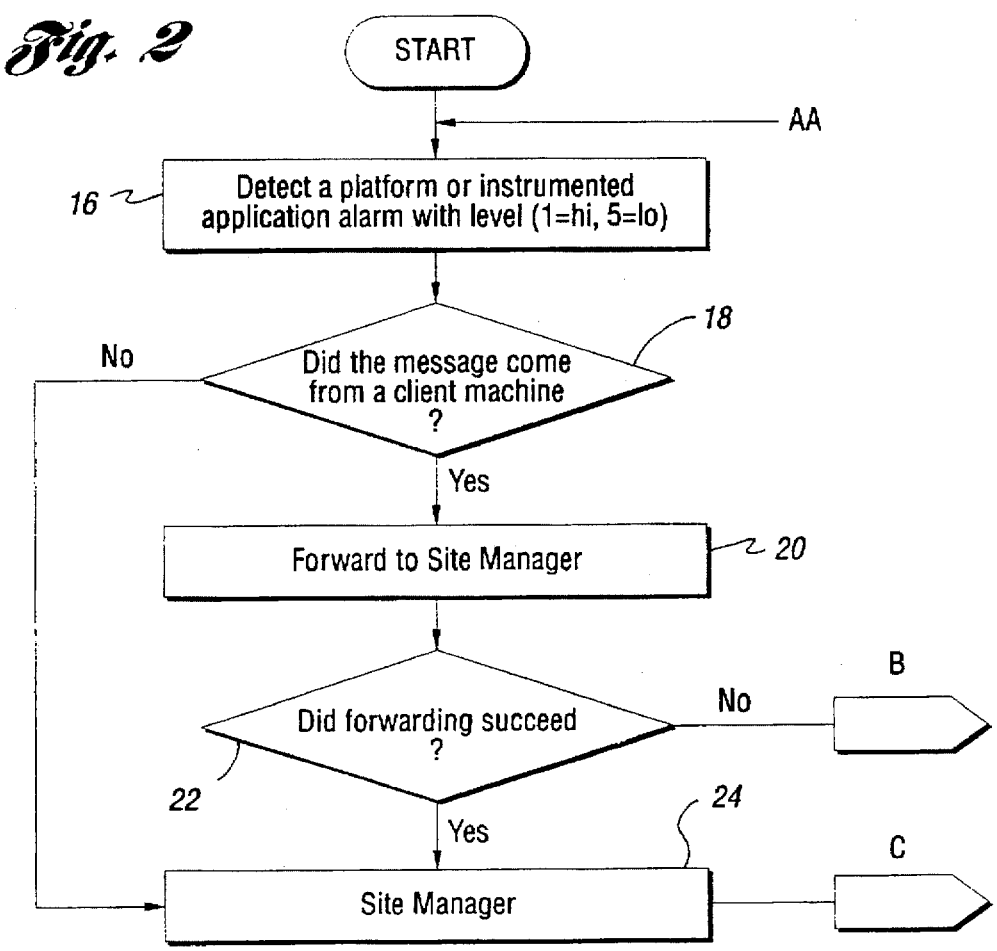
FIG. 2 is a fault detection and primary alarm message signal transmission flowchart of the method and system of the present invention for advance identification of a fault in a software application.

More specifically, referring to FIG. 2, a fault detection and primary alarm message signal transmission flowchart of the method and system of the present invention for advance identification of a fault in a software application is shown. As seen therein, the system software first detects (16) the fault and assigns the detected fault a severity level. The system and method of the present invention does so based on an identification of selected application parameters and the relative criticality of such parameters for the specific software application being monitored.

In that regard, one familiar with the software application designates a number of application parameters for monitoring, along with severity levels associated with various problems that might arise with respect thereto. Such parameters may include, but are not limited to, application variables, routines and sub-routines. The system and method of the present invention then monitor the parameters designated to determine the nature of any fault detected, the nature of the application parameter involved, and to select one of a plurality of severity levels based on the nature of the fault and the nature of the application parameter determined.

Severity levels preferably range from one to five. A level one severity indicates a critical problem that will cause the application to fail if it is not immediately addressed. A level five severity indicates an informational problem only which may cause a more severe disruption of the application in the long run.

In this regard, a typical software application includes multiple processes, such as communications, database access, data manipulation, and many others. For instance, many telephone representatives take customer orders for goods and/or services through interaction with service order software, which typically includes processes such as printer communications, database access and data manipulation for the purposes of customer billing.

Previously, in the event of a problem relating to one of these processes, a software application might simply dump the current data being processed, or may simply quit. In that event, with the service order software described above, the telephone representatives are forced to take customer orders by hand for uploading at a later time when the service order software application fault has been corrected. With the system and method of the present invention, however, the software application instead invokes the system software by transmitting an alarm concerning the problem, including a severity associated therewith, to the system software.

For instance, the service order software previously described requires constant communication with the customer database for frequent updates in order to accomplish customer billings. If the process for database communication does not get an acknowledgment from, and cannot access the customer database, the service order software cannot accomplish such billing and the performance of the entire application is impeded. That is, while other service order software processes have no problems in and of themselves, they are unable to properly function without access to the customer database. Such a database access problem would be characterized as critical since it must be corrected immediately if the service order software is to continue to function properly. Similarly, any other problem that would compromise operation of the entire service order software, such as a communication problem making it impossible to print customer bills, would also be characterized as critical.

Minor level alarms relate to problems that may not need immediate correction in order for the software application to continue to function properly. However, problems resulting in minor level alarms may, if left uncorrected, ultimately result in a complete failure of the software application. An example of a minor level alarm might include the situation where only partial access to the customer database is available to the database communication process of the service order software previously described. As long as customer data is required only from that portion of the database currently accessible, the service order software can continue to function properly. If, however, customer data is required from that portion of the database that is currently inaccessible, the service order software can no longer function properly.

Another example of a minor level alarm might include the situation where the primary service order software printer is down, but an alternate printer is available. Since communication with an alternate printer is not typically as efficient as communication with a primary printer, such a problem slows down, but does not completely impede the progress of the service order software. Furthermore, as long as the alternate printer is operational, the service order software can continue to function properly. If, however the alternate printer fails, the service order software can no longer function properly.

Informational alarms relate to application software problems that are not currently significant, but which may cause a more severe disruption of the application in the long run. An example of an informational alarm might include the situation where a printer associated with the service order software previously described repeatedly runs out of paper due to overuse or a paper jam. By itself, this problem is not significant. However, if the problem arises out of overuse of the printer, it may indicate a communication or signal routing problem that might cause a more severe disruption of the service order software if not corrected. Moreover, if a specific informational alarm continues to appear repeatedly, even after having been previously cleared, the problem associated with the informational alarm may be elevated such that a minor level alarm is generated.

Referring again to FIG. 2, it is thereafter determined (18) whether the fault originated at a client machine (10). If so, information pertaining to the fault is forwarded (20) to the primary site manager (12). Thereafter, it is determined (22) if that forwarding was successful. If so, operation of the system is then transferred (24) to primary site manager (12). Similarly, if it is determined (18) that the fault did not originate at a client machine, operation of the system is also transferred (24) to primary site manager (12). In that regard, a fault not originating at a client machine (10) originates from a site manager (12, 12'), which may also have software applications running therein.

Referring now to FIG. 3, a secondary alarm message signal transmission flowchart of the method and system of the present invention for advance identification of a fault in a software application is shown. As seen therein, if the forwarding to the primary site manager (12) of information pertaining to the fault was not successful, that information is forwarded (26) to a secondary site manager (12'). Thereafter, it is determined (28) if that forwarding was successful. If so, operation of the system is then transferred (30) to the secondary site manager (12'). If not, the information is logged (32) in local storage at the origination point, which may be a client machine (10) or site manager (12, 12').

From the above, it is thus readily apparent that the system and method of the present invention first attempt to route information pertaining to the fault through a primary path, the primary site manager (12). If, however, that path is not operational, the system and method then route the information through a secondary path, the secondary site manager (12'). Nevertheless, by always attempting to route the information through the primary path first, the system and method provide a "self-healing" network where routing of the information reverts from the secondary path to the primary path, if the primary path once again becomes operational after a previous failure.

Referring next to FIG. 4, an alarm message signal filtration flowchart of the method and system of the present invention for advance identification of a fault in a software application is shown. As seen therein, once operation of the system has been transferred to a site manager (12, 12'), information pertaining to the fault is retrieved (34) from the origination point, which again may be a client machine (10) or a site manager (12, 12'). That is, the signal from the origination point is decoded to determine the nature of the fault, its severity, and its source. In that regard, the specific source of the fault is determined according to the fault location in both the computer hardware and in the software application being monitored. That is, a specific client machine (10) or site manager (12, 12') and a specific application process are identified as the source of the fault. Such specific source identification for the fault facilitates correction thereof later, which will be described in greater detail below.

Thereafter, it is determined (36) if an alarm is pending for the origination point determined that has a higher severity level than the current alarm for that same origination point. If so, rather than being forwarded to RMS (14), an alarm counter for that origination point is simply updated (38). If not, however, an alarm message signal is generated based on the fault, its severity, and its source, and then transmitted (40) to RMS (14). In this fashion, only the most severe alarm for an origination point is forwarded to RMS (14) for correction. As the same time, however, a tally is kept for all alarms associated with each origination point. Any transmission of an alarm message signal to RMS (14) is designed to be transparent to, and to go unnoticed by, any operator interacting with the application software. Thus, with the service order software previously described, transmission of an alarm will not be noticed by the telephone representatives.

The escalation feature just described increases the efficiency of the present invention by cutting down on network traffic, which could get extensive where a high number of client machines (10) and site managers (12, 12') are employed. The system and method of the present invention are also capable of providing information on all client machines (10) and site managers (12, 12') having pending alarms, including the severity level of those pending alarms, for a given site. Furthermore, the system and method of the present invention are also adjustable such that an alarm having a known cause that appears repeatedly, even after having been cleared, may be switched off.

Similarly, the logging of problems in local files can be switched on or off at any location, such as a site manager (12, 12') or a client machine (10). The system and method of the present invention is also capable of controlling the size of the files being logged to prevent a client machine (10) from failing because its disk is filled and cannot handle any more incoming messages. Such a situation could arise where a printer goes out of service and every print request results in a message being logged.

In that regard, logging files may be limited by setting (1) the number of messages in a file; (2) the number of messages in a file and the number of files which may ever be generated; and (3) the number of messages in a file and the number of files which may be generated per day. After the limit is reached, the system software automatically rolls back to the first file, erases the older messages, and starts over again.

The system and method of the present invention is also capable of aiding RMS (14) in determining the root cause of a problem. This is done by switching on "non-alarm" levels of messages (preferably 6–18, in conjunction with the 1–5 alarm levels) in the process identified as having the problem. Such "trace messages," provided by the library previously described, allow a user to view the flow of code and parameters associated with the process and decide/deduce the cause of the problem. Once the problem is corrected, the trace messages, logged into trace message files in the client machine (10) under consideration, can be switched off.

Once the alarm message signal is generated and transmitted (40) to RMS (14), the particular process of the software application wherein the fault was detected may be taken off-line, repaired, and re-commissioned. While the process wherein the fault was detected is off-line, however, the rest of the processes making up the application may still function with only minor degradation to the software application as a whole. In such a fashion, a complete outage of the software application may be prevented.

Such de-commissioning, repair, and re-commissioning of the process having the detected fault may be transparent to, and goes unnoticed by, any operators interacting with the software application, depending upon the criticality of the particular process affected. For instance, with the service order software previously described, such de-commissioning, repair, and re-commissioning may not be noticed by the telephone representatives where the process affected relates to printing. In that regard, while a printer process within the service order software is down for repair, print requests can be spooled in a buffer for printing later when the printer process is re-commissioned.

Referring again to FIG. 1, as previously described, the system software of the present invention serves as the reporting mechanism for sending alarm signals to their appropriate destinations. For "slave" servers, or client machines (10), that destination is either the primary site manager (12) or a secondary site manager (12'). For each site manager (12, 12'), that destination is the local table for maintaining a count of each signal sent by either the system software on each client machine (10), or by the software application running on the same platform as any site manager (12, 12'). As previously described, depending upon the severity level of the alarm involved, that destination may also be RMS (14).

Figure 5:
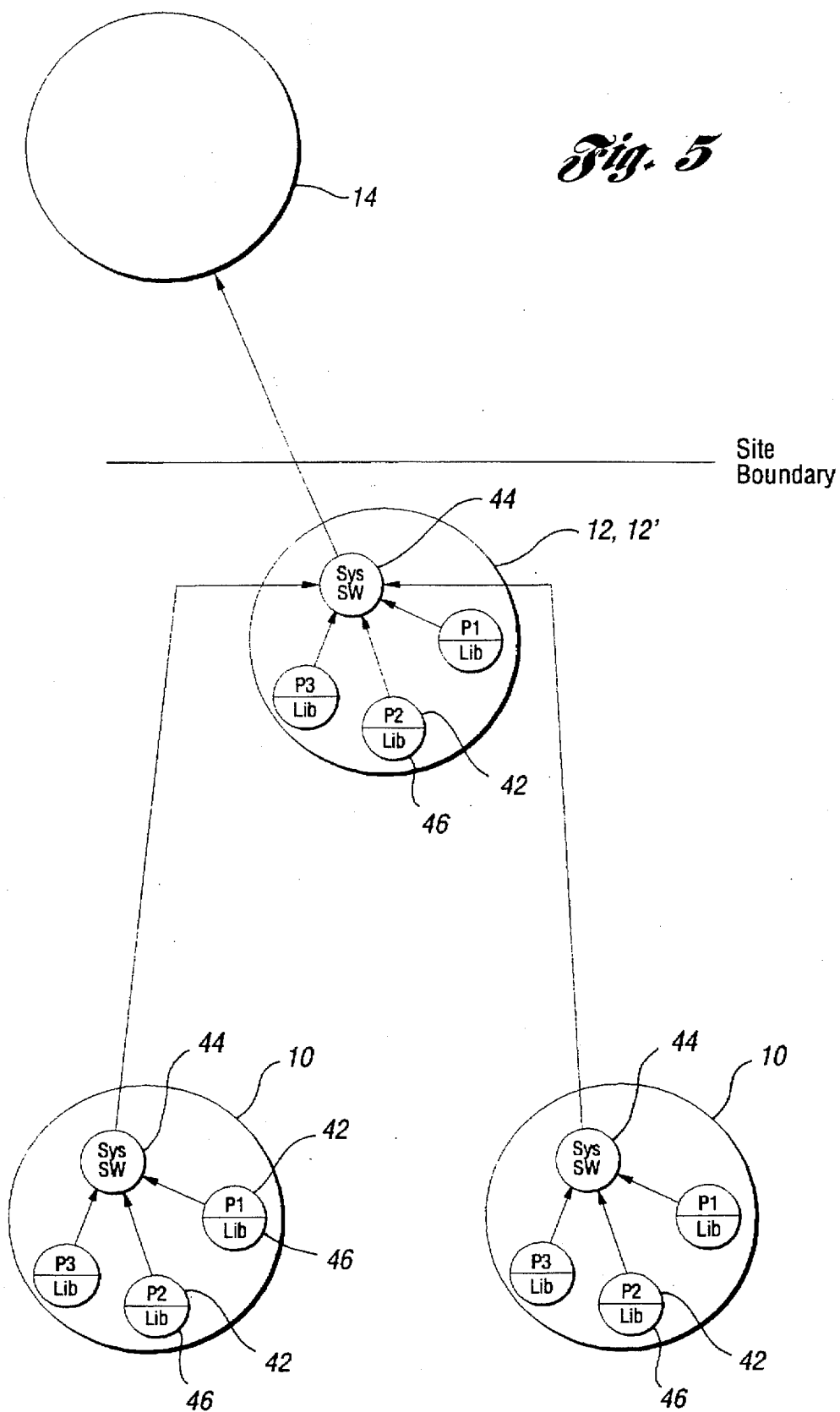
FIG. 5 is a detailed block diagram of the system of the present invention for advance identification of a fault in a software application.

Referring finally to FIG. 5, a more detailed block diagram of the system of the present invention for advance identification of a fault in a software application is shown. As seen therein, three processes of the service order software application previously described are represented by P1, P2, P3 (42) within each client machine (10) and site manager (12, 12'). These processes (42) may be performing different tasks. For instance, P1 may be handling the screen operation of the telephone operators, P2 may be interfacing with the databases, and P3 may be dedicated to handling printers.

Each client machine (10) and site manager (12, 12') also contain the system software (44) of the present invention, which is provided in communication with the processes (42). As previously described, system software (44) is responsible for making decisions such as where to send the alarm signal (i.e., primary site manager (12), secondary site manager (12') if primary site manager (12) unavailable, or local log file if both primary and secondary site managers (12, 12') unavailable). As also previously described, all of the processes (42) are also injected, and provided in communication, with the library (46) of the present invention.

Whenever the software application, including processes (42), detects a problem, it sends a signal to the system software (44), which makes the appropriate determination regarding the destination of the signal and forwards that signal accordingly. Similarly, the system software (44) on the site manager (12, 12') detects an incoming signal form the system software (44) on the client machines (10) and retrieves the relevant information from that signal (including the severity of the problem and its source). Thereafter, the system software (44) on the site manager (12, 12') decides whether to forward the signal to RMS (14) according to the logic of the flowcharts previously described in FIGS. 2–4.

The site manager (12, 12') also records the alarm signal information locally to maintain a tally of all the signals originating form a particular client machine (10) until such time as a user directs the site manager (12, 12') to clear all such information and begin again. Such action may be taken by a user when all problems associated with a particular client machine (10) under consideration have been corrected. After such action, the system and method of the present invention will again function according to the logic previously described and depicted in the flowcharts of FIGS. 2–4. In such a fashion, lower level alarms associated with a particular client machine (10) which previously may not have been forwarded to RMS (14) because of pending higher level alarms now may be forwarded to RMS (14).

From the foregoing, it can be seen that the hardware and software described above together provide means for performing the method steps of detecting a software application fault, determining a severity level of the fault, and identifying a source of the fault. That hardware and software also provide means for performing the method steps of generating an alarm message signal based upon the detected fault, the severity level determined and the identified source, and transmitting the alarm message signal to a remote monitoring station.

The hardware and software described above further provide means for performing the method steps of selecting an application parameter, and monitoring the application parameter during operation of the software application. Still further, that hardware and software provide means for performing the method steps of determining a nature of the fault, determining a nature of the application parameter, and selecting one of a plurality of severity levels based on the nature of the fault and the nature of the application parameter.

Additionally, the hardware and software previously described provide means for performing the method steps of determining a software application location for the fault, and determining a hardware platform location for the fault. Further still, that hardware and software also provide means for performing the method steps of routing the alarm message signal to a primary site manager, routing the alarm message signal to a secondary site manager if the primary site manager is inoperative, and storing the alarm message signal in a local memory if the secondary site manager is inoperative.

The above described hardware and software also provide means for performing the method steps of comparing the severity level associated with the alarm message signal to the severity level associated with a pending alarm message signal, the alarm message signal and the pending alarm message signal each having the same source associated therewith, and routing the alarm message signal from an operative site manager to the remote monitoring station if the severity level associated with the alarm message signal exceeds the severity level associated with the pending alarm message signal. That hardware and software also provide means for performing the method step of updating an alarm message counter if the severity level associated with the alarm message signal does not exceed the severity level associated with the pending alarm message signal.

The hardware and software previously described also provide means for performing the method step of limiting the number of alarm message signals stored in the local file to a predetermined number. Finally, that hardware and software further provide means for performing the method step of generating a trace message signal associated with the application parameter.

From the foregoing, it is also readily apparent that the present invention provides an improved system and method for advance identification of a fault in a software application. More specifically, the system and method of the present invention identify the source of the application fault, report an alarm associated with that fault, and do so well in advance of a complete application failure.

The system and method of the present invention also provide for alternate routes for reporting the alarm associated with the fault in case the primary route is not available. Additionally, such a system and method allow for de-commissioning and repair of only that portion of the software application wherein the fault was detected.

In such a fashion, the system and method of the present invention handle a software application fault pro-actively. By allowing for only partial de-commissioning, the system and method reduce or eliminate complete application downtime. Moreover, through advance notification of an impending fault and early correction thereof, the system and method prevent the application from experiencing complete failure. In turn costs associated with the software application decrease, while revenues and customer satisfaction increase.

It is to be understood that the present invention has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced otherwise than as specifically described.

What is claimed is:

1. A method for identification of a fault in a software application associated with a hardware platform at a site, the software application including a plurality of processes, the method comprising:

detecting the fault;

determining a severity level of the fault;

identifying a source of the fault, the source associated with one of the plurality of processes of the software application;

generating an alarm message signal based upon the detected fault, the severity level determined and the identified source;

transmitting the alarm message signal to a remote monitoring station, the transmitting including
   routing the alarm message signal to a site manager;
   storing a pending alarm message signal having a severity level associated therewith;
   comparing the severity level associated with the alarm message signal to the severity level associated with the pending alarm message signal, the alarm message signal and the pending alarm message signal each having the same source associated therewith; and
   routing the alarm message signal from the site manager to the remote monitoring station if the severity level associated with the alarm message signal exceeds the severity level associated with the pending alarm message signal; and deactivating the one of the plurality of processes of the software application associated with the source of the fault for repair while a remainder of the plurality of processes of the software application continue to operate.

2. The method of claim 1 wherein detecting the fault comprises:
   selecting an application parameter; and
   monitoring the application parameter during operation of the software application.

3. The method of claim 2 wherein determining a severity level for the fault comprises:
   determining a fault nature;
   determining an application parameter nature; and
   selecting one of a plurality of severity levels based on the fault nature and the application parameter nature.

4. The method of claim 3 further comprising generating a trace message signal associated with the application parameter.

5. The method of claim 1 wherein identifying a source for the fault comprises:
   determining a software application location for the fault; and
   determining a hardware platform location for the fault.

6. The method of claim 1 wherein transmitting the alarm message signal further comprises storing the alarm message signal if the site manager is inoperative.

7. The method of claim 6 further comprising limiting the number of alarm message signals stored to a predetermined number.

8. The method of claim 1 wherein transmitting the alarm message signal further comprises updating an alarm message counter if the severity level associated with the alarm message signal does not exceed the severity level associated with the pending alarm message signal.

9. A system for identification of a fault in a software application associated with a hardware platform at a site, the software application including a plurality of processes, the system comprising:

means for detecting the fault;

means for determining a severity level of the fault;

means for identifying a source of the fault, the source associated with one of the plurality of processes of the software application;

means, in communication with the detecting means, the determining means and the identifying means, for generating an alarm message signal based upon the detected fault, the severity level determined and the identified source;

means, in communication with the generating means, for transmitting the alarm message signal to a remote monitoring station, the means for transmitting including
   means for routing the alarm message signal to a site manager;
   means for storing a pending alarm message signal having a severity associated therewith;

means for comparing the severity level associated with the alarm message signal to the severity level associated with the pending alarm message signal, the alarm message signal and the pending alarm message signal each having the same source associated therewith;

means for routing the alarm message signal from the site manager to the remote monitoring station if the severity level associated with the alarm message signal exceeds the severity level associated with the pending alarm message signal; and means, in communication with the transmitting means, for deactivating the one of the plurality of processes of the software application associated with the source of the fault for repair while a remainder of the plurality of processes of the software application continue to operate.

10. The system of claim 9 wherein the means for detecting the fault comprises:

means for selecting an application parameter; and means for monitoring the application parameter during operation of the software application.

11. The system of claim 10 wherein the means for determining a severity level for the fault comprises:

means for determining a fault nature;

means for determining an application parameter nature; and means for selecting one of a plurality of severity levels based on the fault nature and the application parameter nature.

12. The system of claim 11 further comprising means for generating a trace message signal associated with the application parameter.

13. The system of claim 9 wherein the means for identifying a source for the fault comprises:

means for determining a software application location for the fault; and means for determining a hardware platform location for the fault.

14. The system of claim 9 wherein the means for transmitting the alarm message signal further comprises means for storing the alarm message signal if the site manager is inoperative.

15. The system of claim 14 further comprising means for limiting the number of alarm message signals stored to a predetermined number.

16. The system of claim 9 wherein the means for transmitting the alarm message signal further comprises means for updating an alarm message counter if the severity level associated with the alarm message signal does not exceed the severity level associated with the pending alarm message signal.

* * * * *